United States Patent [19]

Narula

[11] Patent Number: 5,403,807
[45] Date of Patent: Apr. 4, 1995

[54] SINGLE PHASE METAL-ALUMINA SOL-GEL PROCESS AND MATERIAL

[75] Inventor: Chaitanya K. Narula, Ann Arbor, Mich.

[73] Assignee: Ford Motor Company, Dearborn, Mich.

[21] Appl. No.: 986,412

[22] Filed: Feb. 8, 1993

[51] Int. Cl.[6] .................. B01J 37/03; B01J 21/04; B01J 23/02; B01J 23/10
[52] U.S. Cl. .................. 502/303; 502/304; 502/302; 502/341; 502/439; 502/170; 502/171
[58] Field of Search .............. 502/303, 304, 341, 439, 502/170, 171, 302

[56] References Cited

U.S. PATENT DOCUMENTS

| | | | |
|---|---|---|---|
| 4,526,885 | 7/1985 | Day et al. | 502/439 X |
| 4,771,028 | 9/1988 | Arai et al. | 502/341 |
| 5,041,405 | 8/1991 | Lunsford et al. | 502/341 X |
| 5,134,107 | 7/1992 | Narula | 502/303 |
| 5,210,062 | 5/1993 | Narula et al. | 502/341 X |
| 5,212,130 | 5/1993 | Addiego et al. | 502/341 X |

*Primary Examiner*—Paul Lieberman
*Assistant Examiner*—Douglas McGinty
*Attorney, Agent, or Firm*—Lorraine S. Melotik; Roger L. May

[57] ABSTRACT

This invention is directed to a method for making metal-aluminum-oxide materials according to sol-gel techniques from particularly defined heterobimetallic alkoxides comprising bis[bis(2-propanolato)aluminum)-tetrakis($\mu$-(2-propanolato)]alkaline-earths and, optionally, tris [(bis(2-propanolato)aluminum)hexakis($\mu$-(2-propanolato))]-lanthanides, and the materials so made. The materials may be in varied forms like sols, gels, xerogels, and calcined materials.

21 Claims, 3 Drawing Sheets

SINGLE PHASE METAL-ALUMINA SOL-GEL PROCESS AND MATERIAL

BACKGROUND OF THE INVENTION

This invention is related to the art of making alkaline-earth-metal-aluminum-oxide and alkaline-earth-metal-lanthamide-aluminum-oxide materials.

Sol-gel processes allow for the low temperature preparation of aluminum oxide materials of high purity and controlled microstructure. These materials can be in such forms as gels, aerogels and xerogels. Sol-gel processes have been found useful in preparing supported and unsupported inorganic membranes for chemical sensor and separation applications, for automobile catalyst washcoats, and for optical coatings for automotive glass. Additionally, these processes have been found useful to prepare monoliths, fibers and monosized fibers from sols.

In some applications, it is desirable to incorporate at least one other metal atom in the aluminum oxide material. For example, it has been found desirable when employing the aluminum oxide material as a catalyst support to include atoms of lanthanum, cerium, calcium, strontium, barium, or all, in the aluminum oxide (alumina) matrix. Incorporating any of these metal atoms in the alumina matrix tends to prevent structural changes that occur in unstabilized $\gamma$-alumina at high temperatures. In addition these metals are desirably included to provide oxygen storage in the alumina for catalytic applications involving oxidation.

When using sol-gel techniques to make the alumina material, these other metal atoms are added by co-hydrolyzing one or more metal alkoxides with aluminum alkoxide. As is well known in the art, such alkoxides when combined in water hydrolyze resulting in a mixture of hydroxides. Additionally, alkaline-earth-metals form insoluble alkoxides which are hard to purify. Thus, a mixture of alkaline-earth-metal alkoxide with aluminum alkoxide does not constitute a suitable precursor. For example, a mixture of aluminum alkoxide and lanthanum alkoxide on hydrolysis forms a mixture of aluminum hydroxide and lanthanum hydroxide. Some amount of mixed hydroxide is also formed. Undesirably the final product of such a mixture comprises a non-uniform two-phase distribution of metal oxide in an aluminum oxide matrix.

SUMMARY OF THE INVENTION

This invention overcomes the above disadvantages and is directed to a method for making single phase alkaline-earth-metal-aluminum-oxide materials and alkaline-earth-metal-lanthanide-aluminum oxide materials which will hereafter be collectively referred to as single phase metal-alumina materials. This method comprises reacting according to sol-gel techniques (A) water and (B) heterobimetallic alkoxides consisting of (i) bis(bis(2-propanolato)aluminum)-tetrakis($\mu$-(2-propanolato))alkaline-earths represented by the general chemical formula M[Al(OPr$^i$)$_4$]$_2$, M being an alkaline-earth-metal; and, optionally, (ii) tris (bis(2-propanolato) aluminum)-hexakis-($\mu$-(2-propanolato))lanthanide represented by the general chemical formula Ln[Al(OPr$^i$)$_4$]$_3$, Ln being a lanthanide. The alkoxides may also comprise mixtures of such disclosed alkoxides, e.g., more than one alkaline-earth-metal alkoxide and, optionally, one or more lanthanide alkoxide. Alkaline-earth-metal is meant to include Ca, Sr, Ba. Lanthanide is meant to include members of the lanthanide series of the Periodic Table such as lanthanum and cerium. When the lanthanum and cerium alkoxides are employed together, they are preferably employed in a molar ratio of 1.1 to 1.3. For example, a calcium-aluminum-oxide material according to present invention is made from bis(bis(2-propanolato)-aluminum)tetrakis ($\mu$-(2-propanolato)) calcium, Ca[Al(OPr$^i$)$_4$]$_2$. The ratio of alkaline-earth-metals and/or lanthanide to alumina can be changed by mixing aluminum alkoxide with the heterobimetallic alkoxide. Thus the ratio of, e.g., Ca to alumina is changed, according to the above example, by mixing Al(OPr$^i$)$_3$ with Ca[Al(OPr$^i$)$_4$]$_2$. A calcium lanthanum-alumina, e.g., is prepared from Ca[Al(OPr$^i$)$_4$]$_2$, and La[Al(OPr$^i$)$_4$]$_3$, and optionally Al(OPr$^i$)$_3$.

According to another aspect of the present invention, it is also directed to sols, gels and subsequent xerogels, and aerogels made by the method disclosed above as well as products made by calcining such materials.

The single phase metal-alumina materials according to the present invention are preferably made from sols by a method which includes forming a reaction mixture comprising the above disclosed heterobimetallic alkoxides and water, and subsequently adding acid to the reaction mixture to form a sol. Since the alkoxides of the present invention are solids they are generally first dissolved in an alcohol, preferably the parent alcohol, i.e., 2-propanol, and then combined with water in forming the reaction mixture. The sol is preferably a clear sol. Alcohol formed as a result of hydrolysis of the alkoxides, as well as any alcohol used as solvent, may be removed from the reaction mixture. The sol may be stabilized to allow use over an extended period of time by heating the sol for a time sufficient to form a stable sol. According to one application of the sol, it is coated onto a substrate and calcined generally at a temperature above about 300° C., preferably between about 300° C. and 900° C., to form a alkaline-earth-aluminum-oxide material. Gels can be prepared by concentrating the sols disclosed above. Xerogels may be prepared from the above disclosed sols by removal of substantially all volatiles. Gels may also be formed directly from the reaction of the heterobimetallic alkoxides and water in alcohol.

The present inventor has recently shown that single phase sol-gel materials prepared from Ln[Al(OPr$^i$)$_4$]$_3$, Ln=La, Ce are superior to others prepared according to prior sol-gel methods employing conventional precursors (C. K. Narula, U.S. Pat. No. 5,134,107). In addition, that patent discloses that gels can be prepared from mixtures of La[Al(OPr$^i$)$_4$]$_3$ and Ce [Al(OPr$^i$)$_4$]$_3$ which exhibit different structural changes on thermal treatment as compared to gels prepared from either one of these particular precursors. This led us to examine sol gel processed materials made from mixtures of M[Al(OPr$^i$)$_4$]$_2$, M=Ca, Sr, Ba and Ln[Al(OPr$^i$)$_4$]$_3$, Ln=La, Ce. We found that the single phase materials prepared from these mixtures also have high surface areas.

DETAILED DESCRIPTION OF PREFERRED EMBODIMENTS

Figure 1:
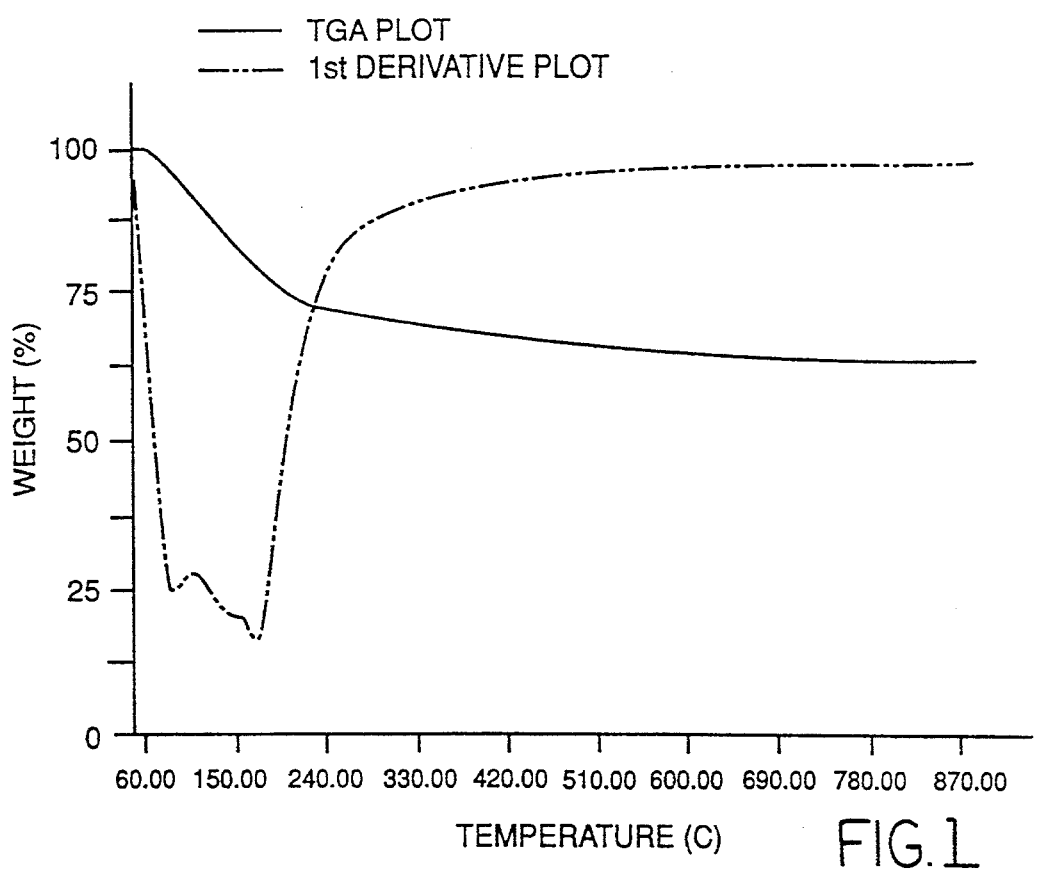
FIG. 1 shows the thermogravimetric analysis of a xerogel prepared according to an embodiment of the present invention by adding water/parent alcohol to a solution of precursor to prepare calcium-alumina materials indicating that weight loss is complete at 350° C.

This invention is directed to a method for making single phase metal-alumina materials according to sol-gel techniques. The metal-alumina materials are made from particular alkoxide compounds which comprise two different metals: alkaline-earth (M) and aluminum (Al), or lanthanide (Ln) and aluminum (Al). This invention is also directed to materials so made. The method comprises, in its broadest embodiment, reacting water and a particular heterobimetallic alkoxide selected from the group consisting of alkaline-earth-metal-aluminum $M[Al(OPr^i)_4]_2$ alkoxides, and lanthanide-aluminum alkoxides, $Ln[Al(OPr^i)_4]_3$, or a mixture of any of them M=Ca, Sr or Ba and Ln=lanthanide elements like La, or Ce. Sol-gel technology is widely known and comprises, at the least, reacting water and an alkoxide having hydrolyzable alkoxy groups. Any such technology may be used to make the material. Preferred sol-gel methods for making the materials according to the present invention are detailed below. Still others considered within the scope of the invention will be apparent to those skilled in the art in view of the present disclosure.

Advantageously, the materials of the present invention comprise alkaline-earth-metal and, optionally, lanthanide metal uniformly distributed throughout the alumina matrix and chemically linked into the alumina by bridges such as metal-oxygen-aluminum or metal-hydroxide-aluminum. It has been found that the invention materials made by sol-gel processes from the particular heterobimetallic alkoxides disclosed herein have a higher surface area than materials conventionally made from mixtures of oxides like aluminum oxide, or their precursors, e.g., nitrates, chlorides, etc. oxided and/or lanthanum oxide. This increased surface area is advantageous, e.g., when the material is employed as a catalyst support.

The heterobimetallic alkoxides employed in the present invention may be made by a method which is an improvement over the method described in "Preparation and Characterization of Some Volatile Double Isopropoxides of Aluminum with Alkaline Earth Metals", R. C. Mehrotra, S. Goel, A. B. Goel, R. G. King and K. C. Nainan, Inorganica Chimica Acta 29(1978)131. In our improved method for making these alkoxides, the reaction time has been lowered to 2 to 8 hours from 8 to 120 hours and yields have been improved from 20 to 86% to 80 to 90%. According to our improved method, pure strontium or barium metals are added to $Al(OPr^i)_3$ in $Pr^iOH$ with or without $HgCl_2$ catalyst and heated under reflux till a clear solution is formed (two hours). Similarly, calcium metal is added to $Al(OPr^i)_3$ in PriOH with a few $HgCl_2$ crystals and heated under reflux to form a clear solution (8 hours). Solvent is removed in vacuum and residues are sublimed in 80 to 90% yields.

Generally, the single phase metal-alumina materials according to the present invention are made from single phase sols. The sol may be made by forming a reaction mixture of the heterobimetallic alkoxides with water, preferably adding acid to the reaction mixture to form a sol. Acids employed in embodiments of the present invention may be selected from any organic and inorganic acids which include, but are not limited to, nitric, hydrochloric, acetic, and propionic acid. The preferred acid is an organic acid, more particularly, acetic acid. Alcohol is generally employed as a solvent for the alkoxide prior to it being combined with water. Alcohols which may be broadly employed according to embodiments of the present invention include 2-propanol, n-butanol, and sec-butanol, with 2-propanol being preferred. The sol is preferably stabilized by maintaining the reaction mixture (sol) for a time and at a temperature sufficient to form a stable sol. A stable sol is one that maintains its sol properties and does not experience any substantial gelling when exposed to air or moisture for a significant period of time, e.g., months. The sols made herein find use, e.g., to prepare ceramic membranes for chemical sensor devices, films, optical coatings on glass, and washcoats for catalysts substrates. In the case of forming such washcoats, the sol would be coated on a substrate and then the coating dried and subsequently calcined at an elevated temperature. Generally calcination is carried out at a temperature above about 350° C., preferably between about 350° C. and 900° C., to remove hydroxy groups and form M-O-Al bridges to form a single phase metal-alumina material according to an embodiment of the present invention.

According to one preferred method of preparing a single phase sol of, e.g., calcium-alumina according to the invention, $Ca[Al(OPr^i)_4]_2$, the calcium aluminum alkoxide, is dissolved in an alcohol and then added to water at an elevated temperature generally with stirring. This reaction mixture is then further heated and an acid is added to it. The reaction mixture is maintained at an elevated temperature to remove 2-propanol solvent formed as a result of the hydrolysis of the alkoxide. The acids may independently be selected from any organic and inorganic acids. Generally, acetic acid is preferred to help obtain the clear sol. The sol is desirably maintained at gentle reflux at an elevated temperature for an extended time to stabilize the sol.

Optimal processing conditions such as reaction times and temperatures as well as amounts of components like solvents for making the sol may vary as would be apparent to those skilled in the art in view of the present disclosure. For example, according to one embodiment, the reaction mixture may be formed at 60°, then heated to 95° C. to form the sol. On concentrating the sol, gel formation takes place, and if it is further dehydrated at an elevated temperature, e.g., 100° C., it forms a xerogel of amorphous calcium-alumina. The xerogel may be heated to transform any Ca-(OH)-Al bonds to Ca-O-Al bonds. The sol may be coated onto a substrate such as glass and dried to obtain a xerogel in the form of a supported membrane. According to another application, the sol is coated onto a substrate and calcined generally at a temperature above about 300° C., preferably between about 300° C. and 900° C., to form a calcium-aluminum-oxide material.

Figure 4:
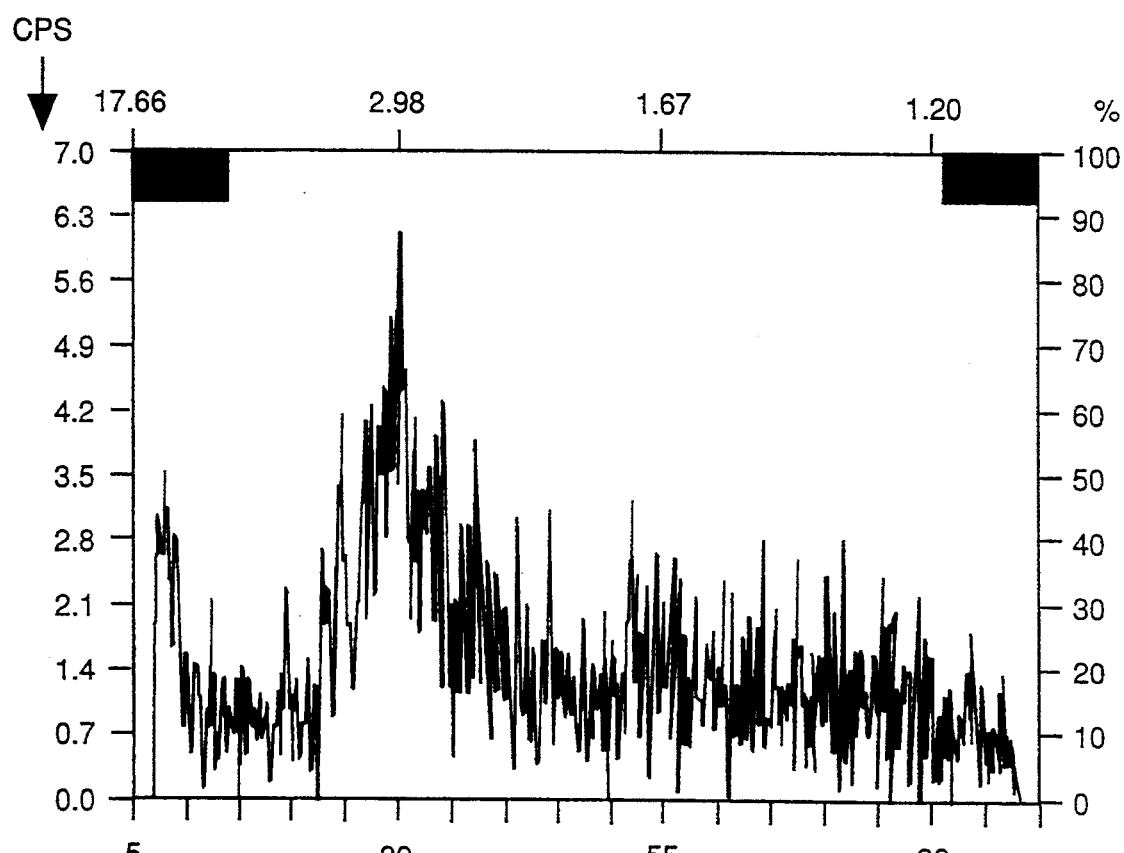
FIG. 4 is an X-ray powder diffraction study of one embodiment of the present invention comprising single phase calcium-alumina materials after heating at 350° C. which shows it is amorphous.

Rather than forming a gel from the sol above, gels may be made more directly from the disclosed calcium aluminum alkoxides. For example, the addition of a wet alcohol, generally meant to be one containing more than 4 equivalents of water, to a solution of the calcium-aluminum alkoxide in an alcohol at room temperature results in gel formation instantaneously at the contact layer. Complete gelation results with time, and if volatiles are removed, a xerogel consisting essentially of calcium-aluminum-oxide is produced. Alternatively, a gel may be prepared along the lines of the sol preparation disclosed herein except that more equivalents of water are used than in sol preparation. For example to form the gel, 12 equivalents of water mixed in alcohol may be added to a solution of the alkoxide in an alcohol. The mixing generally is carried out at a low temperature such as −78° C. and on warming, e.g., to −20° C., a gel is obtained. The gel may be converted to a xerogel by removal of the solvent, preferably in a vacuum. A metal-alumina aerogel may be prepared from the gel by critical point drying. FIG. 1 shows thermogravimetric analysis of the xerogel and indicates that weight loss is complete at 350° C. The gel was fired at 350° C. and examined by x-ray powder defraction (FIG. 4) which showed it to be amorphous.

The following is a preferred embodiment of a process for forming a strontium-aluminum-oxide material according to the present invention. A single phase sol from $Sr[Al(OPr^i)_4]_2$ may be prepared by forming a solution of this alkoxide in alcohol and combining it with water at an elevated temperature such as 90° C. A gel forms immediately. After the reaction mixture is stirred at an elevated temperature, e.g., 90° C. for 30 minutes, addition of an acid, e.g, acetic acid, results in sol formation. To stabilize the sol, it is preferably heated at an elevated temperature for an extended time, e.g.,90° C. for 16 hours. The sol can be converted to a gel by the partial evaporation of the solvent. The sol can be used, for example, as a coating on a substrate and subsequently calcined as disclosed herein.

Figure 2:
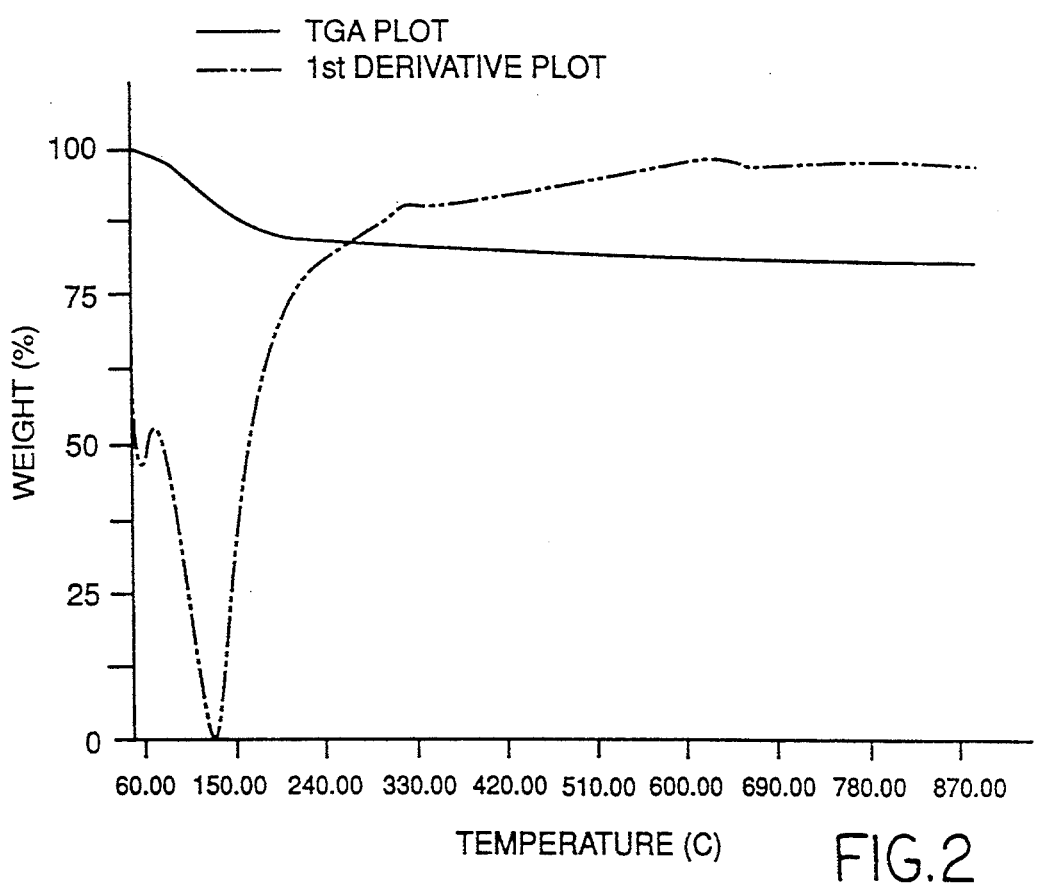
FIG. 2 shows the thermogravimetric analysis of a xerogel prepared according to an embodiment of the present invention by adding water/parent alcohol to a solution of precursor to prepare barium-alumina materials indicating that weight loss is complete at 400° C.
Figure 3:
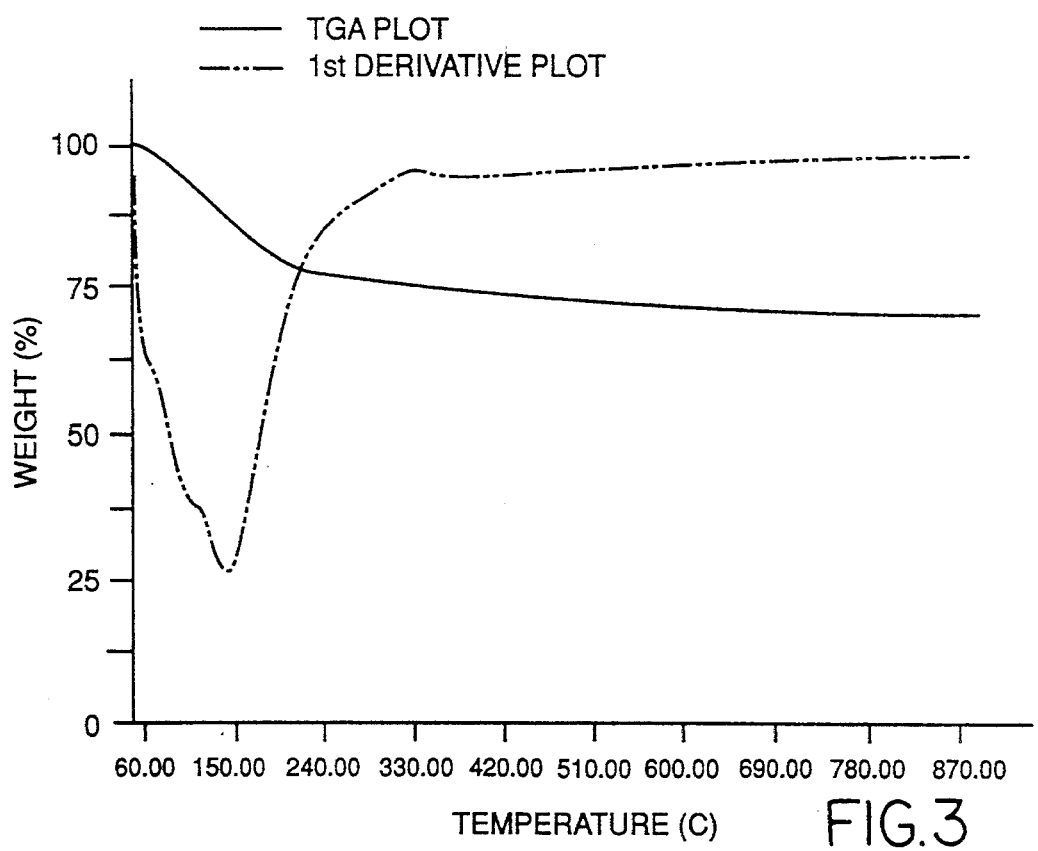
FIG. 3 shows the thermogravimetric analysis of a xerogel prepared according to an embodiment of the present invention by adding water/parent alcohol to a solution of precursor to prepare strontium-alumina materials indicating that weight loss is complete at 350° C.

The reaction of $Sr[Al(OPr^i)_4]_2$ with four or more equivalents of water at a low temperature, e.g., −78° C., yields a sol which undergoes gelation on warming. The gel which is obtained may be dried, e.g., in a vacuum, to yield a xerogel as a fine powder. The thermogravimetric analysis of sample (FIG. 2) shows that it loses 25% weight on heating. The powder is found to be amorphous by x-ray powder diffraction studies.

Figure 5:
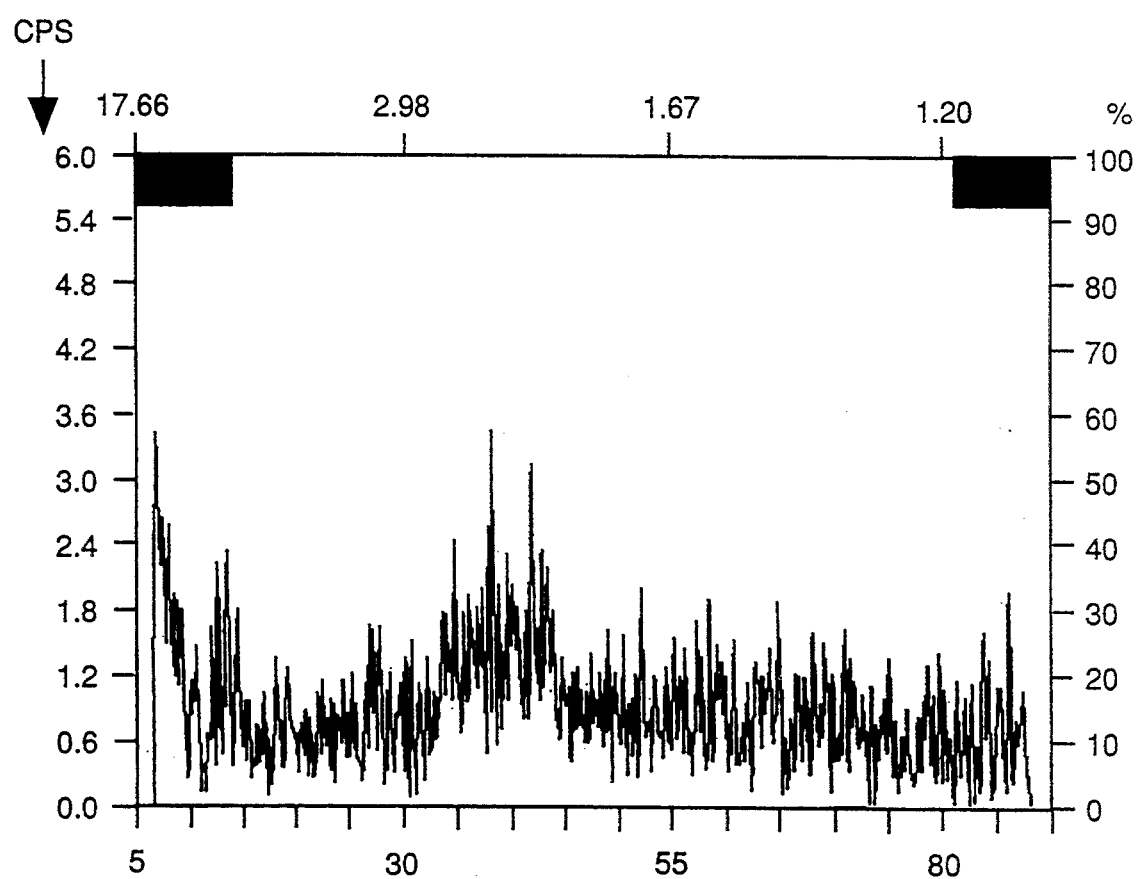
FIG. 5 is an X-ray powder diffraction study of one embodiment of the present invention comprising single phase barium-alumina materials after heating at 400° C. which shows it is amorphous.

The reaction of $Ba[Al(OPr^i)_4]_2$ with four or more equivalents of water at low temperature, e.g., −78° C., yields a sol which undergoes gelation on warming. The gel which is obtained may be dried, e.g., in a vacuum, to yield a xerogel as granular powder. Thermogravimetric analysis of the powder (FIG. 2) shows a weight loss of 18.7% in the temperature range 50°–400° C. and no further weight loss in the temperature range of 400°–900° C. The x-ray powder diffraction of the powder after heating at 400° C. shows it to be amorphous (FIG. 5).

As previously discussed herein, sol-gel techniques may also be employed to make alumina materials comprising alkaline-earth-metals and lanthanide, e.g., lanthanum and/or cerium atoms, as a single phase material. According to a preferred method optimally carried out in a strictly inert atmosphere, a mixture of at least one of (i) $M[Al(OPr^i)_4]_2$, M=Ca, Sr, Ba, and (ii) $Ln[Al(OPr^i)_4]_3$, Ln=La, Ce, is dissolved in alcohol and water. The reaction mixture (suspension) formed is stirred at an elevated temperature and then an acid of the type disclosed hereinbefore is added. Preferably alcohol is removed from the reaction mixture after which it is heated under gentle reflux for an extended period of time to form a stable sol and then allowed to cool. Preferably, when one of (i) and both (ii) are employed, the alkoxides are employed in a molar ratio of about 1:1:1 may be employed (any desired ratio) in forming the sol. For automotive exhaust gas conversion applications, a coating of the sol provided on a substrate would be calcined at an elevated temperature as disclosed herein. A xerogel of the sol material is prepared by evaporation of all of the solvent from the reaction mixture.

A single phase gel may be prepared according to an embodiment of this invention from these two heterobimetallic alkoxides (i) and (ii) above. Accordingly, after they are dissolved in alcohol a stoichiometric amount of water is added to replace all 2-propanolato groups of the alkoxides. The water is generally used dissolved in an alcohol. The water/alcohol mixture is added slowly with stirring at a low temperature, e.g., −78° C. After complete addition, stirring is stopped and the reaction mixture is slowly warmed to, e.g., room temperature. Gel formation takes place at a low temperature. A xerogel may be obtained by removing the volatiles as in a vacuum. The xerogels may be heated to elevated temperatures and maintained at that temperature to obtain a powdered amorphous material.

As will be apparent to those skilled in the art in view of the present disclosure, the time, temperature, alcohols and acids employed in these sol-gel techniques may be varied while staying within the scope of the present invention.

EXAMPLE 1

Modified Preparation of heterobimetallic alkoxides

Preparation of $Ca[Al(OPr^i)_4]_2$

A round bottom flask is charged with calcium metal (0.9 g 22.4 mmol) and freshly distilled $Al(OPr^i)_3$ (9.17 g 44.9 mmol) and fitted with a condenser. 2-Propanol (60 ml) and a few crystals of $HgCl_2$ are added to the reaction vessel. The reaction begins immediately on heating under reflux and calcium metal dissolves over a period of ten hours. The reaction mixture is cooled and volatiles are removed to obtain a white powder which was sublimed in vacuum. Yield 10.24 g 80%.

Preparation of $Sr[Al(OPr^i)_4]_2$

Strontium metal (1.91 g, 21.8 mmol), $Al(OPr^i)_4$ (8.95 g, 43.8 mmol) in $Pr^iOH$ are placed in a 100 ml flask fitted with a condenser. The reaction mixture is heated under reflux for two hours, cooled and stripped of solvent in vacuum. The residual white powder is sublimed. Yield 11.4%.

Preparation of $Ba(OPr^i)_4]_2$

A mixture of barium metal (2.80 g, 20.4 mmol), Al$(OPr^i)_3$ (8.34 g, 40.8 mmol) in $Pr^iOH$ (60 ml) is heated under reflux in a flask fitted with a condenser. After two hours, reaction mixture was cooled and solvent was removed in vacuum. The residual powder was sublimed. Yield 11.7 g 86%.

EXAMPLE 2

General Method to Incorporate Calcium, Strontium or Barium in an Alumina Matrix according to an embodiment of the present invention M[Al(OPr$^i$)$_4$]$_2$, M=Ca, Sr, or Ba, (3.0 g) was dissolved in 2-propanol (25 ml) and the reaction mixture was cooled to −78° C. Water (eight equivalents) mixed with 2-propanol was slowly added to the reaction mixture with stirring. Stirring was discontinued after complete addition and the reaction mixture was allowed to warm to room temperature. A transparent gel is obtained which was dried in vacuum to prepare a xerogel which lost water on heating to 300° C. The resulting amorphous powders had aluminum to alkaline earth metal ratio of 2:1 and surface areas of 80–100 m$^2$/g.

EXAMPLE 3

Preparation of a Lanthanum-Cerium-Barium-Alumina according to the present invention A mixture of M[Al(OPr$^i$)$_4$]$_3$ M=La (1.4 g), Ce (1.4 g), and Ba (Al(OPr$^i$)$_4$)$_2$ (0.78 g) was dissolved in 2-propanol (30 ml) and the reaction mixture was cooled to −78° C. Water (0.7 g) dissolved in 2-propanol was added with stirring. After complete addition the reaction mixture was slowly warmed to room temperature to obtain a gel. The volatiles were removed to obtain an amorphous xerogel. The xerogel was lost water on heating at 400° C. The powder obtained after firing at 500° C. has La:Ce:Ba:Al ratio of 1:1:1:8 and surface area of 162 m$^2$/g.

EXAMPLE 4

General Method for Preparation of Sols according to the present invention

M(Al(OPr$^i$)$_4$]$_3$, M=Ba, (3.0 g) was dissolved in Pr$^i$OH (50 ml) and added to hot water (80 ml at 80° C.) with stirring. The temperature was raised to 90° C. and Pr$^i$OH was evaporated. Glacial acetic acid (2 ml) was added slowly and reaction mixture was heated under gentle reflux for 16 hours to form a clear sol.

I claim:

1. A method for making a single phase metal-alumina material by sol-gel techniques which comprises:
    reacting (A) water and (B) heterobimetallic alkoxide consisting of (i) bis(bis(2-propanolato)aluminum)-tetrakis($\mu$-(2-propanolato))alkaline-earths; and, optionally, (ii) tris (bis(2-propanolato)aluminum)hexakis($\mu$-(2-propanolato))lanthanides.

2. The method according to claim 1 wherein said alkaline-earth is selected from calcium, strontium and barium and said lanthanide is selected from lanthanum and cerium.

3. A single phase metal-alumina material resulting from the practice of the method of claim 1.

4. The method according to claim 1 which comprises:
    forming a reaction mixture from water and said heterobimetallic alkoxides; and
    adding acid to said reaction mixture to form a sol.

5. The method according to claim 4 which further comprises heating said reaction mixture prior to the addition of said acid.

6. The method according to claim 4 wherein said method further comprises removing from said reaction mixture alcohol formed as a result of hydrolysis of said heterobimetallic alkoxides.

7. The method according to claim 4 wherein said method further comprises the step of maintaining said reaction mixture a time and at an elevated temperature sufficient to form a stable sol.

8. The method according to claim 7 which further comprises the step of concentrating said sol to obtain a gel.

9. The method according to claim 7 which further comprises the step of applying a coating of said sol to a substrate and heating said coating to a temperature above about 300° C. to calcine said coating.

10. A metal-alumina material resulting from the practice of the method of claim 7.

11. The method according to claim 1 which comprises:
    forming a reaction mixture from water and said heterobimetallic alkoxides;
    maintaining the reaction mixture at an elevated temperature to form a gel thereof; and
    adding an acid to said gel to convert said gel to a sol.

12. The method according to claim 11 which further comprises the step of applying a coating of said sol to a substrate and heating said coating to a temperature above about 300° C. to calcine said coating.

13. A metal-alumina material resulting from the practice of the method of claim 11.

14. The method according to claim 2 wherein said heterobimetallic alkoxide employed comprises both
    (a) tris(bis(2-propanolato)aluminum)hexakis($\mu$-(2-propanolato))lanthanum and (b) tris(bis(2-propanolato)aluminum)hexakis($\mu$-(2-propanolato))-cerium.

15. The method according to claim 14 wherein said (a) and (b) are employed in a molar ratio of about 1:1 to 1:3.

16. The method according to claim 14 which further comprises the step of removing from said reaction mixture alcohol formed as a result of the hydrolysis of said heterobimetallic alkoxides.

17. The method according to claim 14 wherein said method further comprises the step of heating said reaction mixture at an elevated temperature.

18. The method according to claim 14 wherein said method further comprises concentrating said sol to obtain a gel.

19. The method according to claim 14 which further comprises the step of applying a coating of said sol to a substrate and heating said coating to a temperature above about 300° C. to calcine said coating.

20. A single phase metal-alumina material resulting from the practice of the method of claim 14.

21. A single phase metal-alumina material according to claim 3 wherein said material is selected from the group consisting of sols, gels, xerogels, aerogels and calcined sols, calcined gels, calcined xerogels, and calcined aerogels.

* * * * *